(12) United States Patent
Abou Mahmoud et al.

(10) Patent No.: US 9,954,945 B2
(45) Date of Patent: Apr. 24, 2018

(54) ASSOCIATING CONTEXTUAL INFORMATION WITH ELECTRONIC COMMUNICATIONS

(71) Applicant: International Business Machines Corporation, Armonk, NY (US)

(72) Inventors: Alaa Abou Mahmoud, Dracut, MA (US); Vinod A. Valecha, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 14/755,077

(22) Filed: Jun. 30, 2015

(65) Prior Publication Data

US 2017/0006094 A1  Jan. 5, 2017

(51) Int. Cl.
*H04L 29/08* (2006.01)
*G06F 17/30* (2006.01)
*G06F 12/14* (2006.01)

(52) U.S. Cl.
CPC ...... *H04L 67/1095* (2013.01); *G06F 12/1408* (2013.01); *G06F 17/3053* (2013.01); *H04L 67/22* (2013.01); *G06F 2212/1052* (2013.01)

(58) Field of Classification Search
CPC . H04L 67/1095; H04L 67/22; G06F 12/1408; G06F 17/3053; G06F 2212/1052
See application file for complete search history.

(56) References Cited

U.S. PATENT DOCUMENTS

| | | | |
|---|---|---|---|
| 7,353,455 B2 | 4/2008 | Malik | |
| 8,655,958 B2 | 2/2014 | Callanan et al. | |
| 9,258,143 B2 * | 2/2016 | Chavez | |
| 2010/0180001 A1 * | 7/2010 | Hardt | G06F 11/32 709/207 |
| 2011/0208816 A1 | 8/2011 | Chavez | |
| 2013/0262230 A1 * | 10/2013 | King | G06Q 30/02 705/14.54 |
| 2014/0088954 A1 | 3/2014 | Shirzadi et al. | |

OTHER PUBLICATIONS

"System for group notification", An IP.com Prior Art Database Technical Disclosure, IP.com No. 000208812, Publication Date: Jul. 19, 2011.

* cited by examiner

*Primary Examiner* — Wasika Nipa
(74) *Attorney, Agent, or Firm* — Daniel R. Simek

(57) ABSTRACT

A method for associating contextual information with an electronic communication. The method includes a computer processor monitoring one or more activities of a user of a computing device, and determining contextual information respectively associated with the one or more monitored activities of the user, wherein contextual information includes information describing the one or more monitored activities. The method further includes identifying the user initiating an electronic communication and a time that the user of the computing device initiates the electronic communication. The method further includes determining at least one of the one or more monitored activities that occur within a window of time, relative to the time that the user of the computing device initiates the electronic communication, and storing the contextual information respectively associated with the at least one of the one or more monitored activities that occurred within the window of time in association with the electronic communication.

14 Claims, 4 Drawing Sheets

ASSOCIATING CONTEXTUAL INFORMATION WITH ELECTRONIC COMMUNICATIONS

BACKGROUND OF THE INVENTION

The present invention relates generally to the field of electronic communications, and more particularly to associating contextual information with electronic communications.

Developments in electronics and computing technology have resulted in a proliferation of computing devices of varying sizes and capabilities for business and personal use. Some computing devices (e.g., electronic devices) are small and highly mobile, such as smart phones and wearable devices (e.g., smart glasses). Other computing devices are multi-screen desktop systems capable of simulations and animated 3-D image renderings. Some common threads between these computing devices and the users of these computing devices include an increase in the volume of communications, multi-tasking, and multi-media information. One evolving and growing application of multi-tasking by the users of computing devices is in electronic communication, and more specifically social media. Social media is rich with contextual information. Users can post pictures, along with comments and the location of the users, at the time of taking the picture, which may be identified by geo-locating applications. Social media is not restricted to personal settings. Businesses operate in different time-zones and in different countries and employees work collaboratively across distances. Similarly, news, information, and communications are shared world-wide.

Furthermore, electronic communications become more complex when a single communication may include multiple modalities, such as short message service (SMS) messaging, voice, video, text, e-mail, instant messaging (IM), social media, blogs, etc. In addition, not all electronic communications are transmitted between users. Some electronic communications may be associated with a single user as opposed to being shared or transmitted, such as calendar entries and alert messages. Given these complexities, the increase in volume of electronic communications, and the anticipated speed of response by other users, it may be important for a user to know the context associated with the creation of an electronic communication.

SUMMARY

According to an aspect of the present invention, there is a method, computer program product, and/or system for associating contextual information with an electronic communication. The method includes one or more computer processors monitoring one or more activities of a user of a computing device. The method further includes one or more computer processors determining contextual information respectively associated with the one or more monitored activities of the user, wherein contextual information includes information describing the one or more monitored activities. The method further includes one or more computer processors identifying the user of the computing device initiating an electronic communication and a time that the user of the computing device initiates the electronic communication. The method further includes one or more computer processors determining at least one of the one or more monitored activities that occur within a window of time, relative to the time that the user of the computing device initiates the electronic communication. The method further includes one or more computer processors storing the contextual information respectively associated with the at least one of the one or more monitored activities that occurred within the window of time in association with the electronic communication.

DETAILED DESCRIPTION

Figure 1:
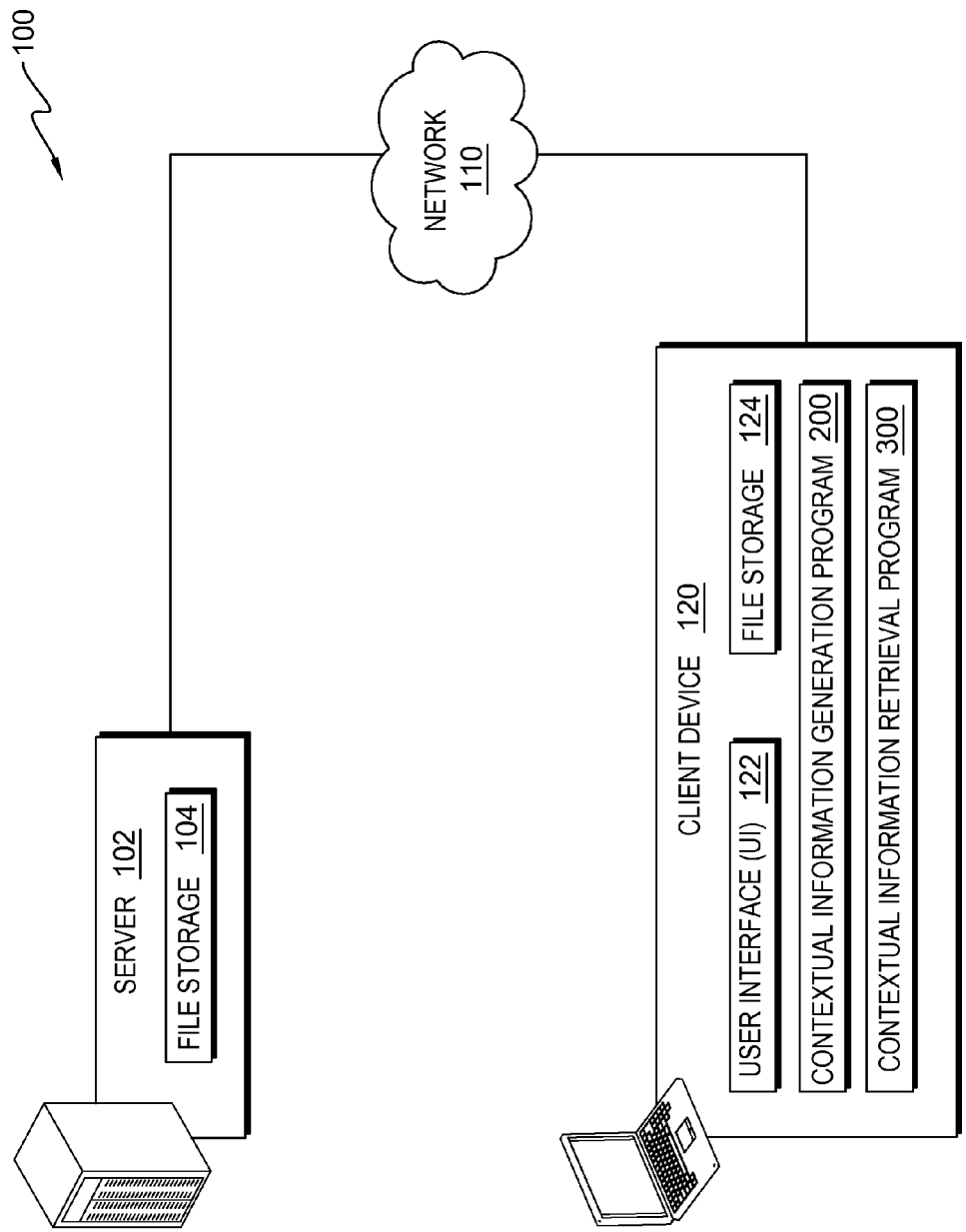
FIG. 1 illustrates a distributed data processing environment, in accordance with an embodiment of the present invention.

Embodiments of the present invention recognize that relevant background information is not always documented within an electronic communication. Personal electronic communications, such as calendar entries or "to-do's" that are set for a future time may have the rationale for their creation forgotten by the human that created the calendar entries or the "to-do's." Attaching contextual information to electronic communications permits a user to more quickly determine the relevant events and information surrounding the creation of an electronic communication. Contextual information sent with an electronic communication may inform the receiver of the electronic communication as to which resources the sender of the electronic communication may have utilized. Contextual information can be included prior to and during the creation of the electronic communication. Contextual information may identify some of the relevant events surrounding the creation of an electronic communications. Linking contextual information to or embedding contextual information within an electronic communication serves to provide a current or future reference for alert notifications, blog posts, meeting invitations, e-mails, instant messages (IMs), etc.

Embodiments of the present invention provide other users a method to obtain contextual information based on user activities prior to the initiation (e.g., creation) of an electronic message. In the field of information security, user activity monitoring (UAM) is the monitoring and recording of user actions. UAM captures user actions, including the use of applications, windows opened, system commands executed, check boxes clicked, text entered/edited, URLs visited, and nearly every other on-screen event. Embodiments of the present invention permit a user of a computing device to utilize these recorded actions to add contextual references to electronic communications. In addition, data "spiders" and other utilities permit the extraction of a deeper level of contextual information from monitored user actions. For example, meta-data can be extracted from a browsed webpage, the properties of an electronic document, or social networking information from social media communications.

Some embodiments of the present invention incorporate the contextual information within an electronic communication. For example, the contextual information may be self-evident in the form of a header, footer, or in-line comments/information (e.g., web links). In other examples, the contextual information may be incorporated as meta-data, comments, or part of the properties of the electronic communication. Other embodiments of the present invention place the contextual information in a separate file, which may transmit before, during, or after the electronic communication. In yet other embodiments, the contextual information may be stored in a repository that can be viewed independent of the electronic communication.

Additional embodiments of the present invention provide a receiver of an electronic communication the opportunity to react to the contextual information of the electronic message when some or all of an electronic communication is not received. For example, a user of a computing device may be covering a news event, such as a natural disaster or political rally. Embodiments of the present invention permit real-time transmission of the contextual information. For example, the user of the computing device may have a geo-locating function active on the computing device while transmitting a real-time electronic communication, such as a streaming video. Should the computing device or the communication supporting the computing device go off-line (e.g., fail), a colleague receiving the electronic communication and related contextual data may respond utilizing the geo-location information within the contextual information, advise a superior of the failure of the electronic communication, and provide the geo-location information to the superior.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating distributed data processing environment 100 in an embodiment, in accordance with the present invention. An embodiment of distributed data processing environment 100 includes server 102 and client device 120 interconnected over network 110. Many modifications to the depicted environment may be made by those skilled in the art without departing from the scope of the invention as recited by the claims.

Server 102 and client device 120 may be laptop computers, tablet computers, netbook computers, personal computers (PC), desktop computers, personal digital assistants (PDA), smart phones, wearable devices (e.g., digital eyeglasses, smart glasses, a smart watch), or any programmable computer systems known in the art. In certain embodiments, server 102 and client device 120 represent computer systems utilizing clustered computers and components (e.g., database server computers, application server computers, etc.) that act as a single pool of seamless resources when accessed through network 110, as is common in data centers and with cloud-computing applications. In general, server 102 and client device 120 are representative of any programmable electronic device or combination of programmable electronic devices capable of executing machine readable program instructions and communicating with client computers, such as client device 120, via network 110. Server 102 may include components, as depicted and described in further detail with respect to FIG. 4, in accordance with embodiments of the present invention.

Server 102 includes file storage 104 and various programs (e.g., text editor, encryption utilities, etc.) (not shown). In some embodiments, server 102 may contain a database program that maintains and retrieves contextual information and/or electronic communications stored in databases within file storage 104.

In embodiment, file storage 104 contains databases and log files that store the contextual information separate from the electronic communications. In one scenario, contextual information is stored separately when the contextual information cannot be embedded in an electronic communication. In another scenario, a copy of the contextual information is stored within file storage 104 permitting the user of client device 120 to trace conversation threads of electronic conversations. In another embodiment, file storage 104 is part of an application-based storage environment where both an electronic communication and the related contextual information reside. In one scenario, file storage 104 is part of an enterprise-based office environment. For example, file storage 104 includes databases that store the e-mails and calendar entries for enterprise-based e-mail clients and calendar clients. In another scenario, file storage 104 supports web-based e-mail clients, calendar clients, etc. File storage 104 is accessible by contextual information retrieval program 300 to search for contextual information relating to one or more previously received or processed electronic communications.

In a different embodiment, client device 120 utilizes file storage 104 on server 102 for temporary storage of monitored user activities and contextual data. In one scenario, client device 120 may be resource constrained (e.g., lack of memory, lack of persistence storage) such that various embodiments of the present invention utilize file storage 104. In another scenario, the programs, applications, and electronic communication program utilized by a user execute on another computing device; therefore, the contextual information is not stored on client device 120. For example, a user may execute a virtual private network program and a remote desktop program on client device 120 to access and perform work on another computing device accessible via network 110.

In addition, file storage 104 may include various user preferences in the event that a user utilizes programs or applications external to client device 120 to create an electronic communication which generates an instance of UI 122 specific to that external program or application. Other user preferences stored within file storage 104 may include: durations (e.g., windows of time) for aggregating contextual information, criteria which bias the duration of a window of time, types of contextual information that are excluded, which types of electronic communications have embedded contextual information, and storage locations (e.g., network drive, cloud-backup, etc.) for contextual information. Still other user preferences include criteria and weighting factors utilized on ranking contextual information elements (e.g., pieces of information) and determining the number of contextual elements that are transmitted and/or stored. The user preferences stored within file storage 104 may be different from user preferences stored in file storage 124.

In one embodiment, client device 120 and server 102 communicate through network 110. Network 110 can be, for example, a local area network (LAN), a telecommunications network, a wireless local area network (WLAN), a wide area network (WAN), such as the Internet, or any combination of the previous, and can include wired, wireless, or fiber optic connections. In general, network 110 can be any combination of connections and protocols that will support communications between client device 120 and server 102, in accordance with embodiments of the present invention. In another embodiment, network 110 operates locally via wired, wireless, or optical connections and can be any combination of connections and protocols (e.g., near field communication (NFC), laser, infrared, etc.).

Client device 120 includes user interface (UI) 122, file storage 124, contextual information generation program 200, contextual information retrieval program 300, and various programs (not shown). Examples of programs (not shown) that client device 120 includes are: an e-mail client, a word processor, a web browser, a multi-media player, security software (e.g., a firewall program, an anti-virus program, an encryption program, etc.), an instant messaging (IM) application (app), and a communication (e.g., phone) application. A user of client device 120 can interact with UI 122 via a singular device, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate UI 122 operating within the GUI of client device 120. UI 122 accepts input from a plurality of input/output (I/O) devices (not shown) including, but not limited to, a tactile sensor interface (e.g., a touch screen, a touchpad) or a natural user interface (e.g., voice control unit, motion capture device, etc.). An I/O device interfacing with UI 122 may be connected to client device 120 which may operate utilizing wired (e.g., USB port) or wireless network communications (e.g., infrared, NFC, etc.). For example, an I/O device may be a peripheral, such as a keyboard, a mouse, a trackball, and a click wheel that provide input from a user.

In one embodiment, file storage 124 contains databases and log files which store the contextual information separate from the electronic communications. In one scenario, contextual information is stored separately when the contextual information cannot be embedded in an electronic communication. In another scenario, a copy of the contextual information is stored within file storage 124 permitting the user of client device 120 to trace conversation threads of electronic conversations. In some embodiments, file storage 124 is part of an application based storage environment where both an electronic communication and the related contextual information reside. File storage 124 is accessible by contextual information retrieval program 300 to search for contextual information relating to one or more previously received or processed electronic communications.

In addition, file storage 124 includes various user preferences. One user preference may determine when contextual information generation program 200 activates (e.g., at the power on of client device 120). Other user preferences stored in file storage 124 may include: durations (e.g., windows of time) for aggregating contextual information, criteria which bias the duration of a window of time, types of contextual information that are excluded, which types of electronic communications have embedded contextual information, and storage locations (e.g., network drive, cloud-backup, etc.) for contextual information. Still other user preferences include criteria and weighting factors utilized on ranking contextual information elements (e.g., pieces of information) and determining the number of contextual elements that are transmitted and/or stored.

Contextual information generation program 200 monitors the activity of a user to obtain contextual information associated with one or more user activities prior to the generation of an electronic message. In some embodiments, contextual information generation program 200 may be a hosted application. For example, contextual information generation program 200 may be a web-based application utilized by the user of client device 120. In other embodiments, contextual information generation program 200 may store contextual activity in parallel paths. For example, contextual information generation program 200 may store contextual activity on client device 120, on server 102, and a back-up client (e.g., replication database) accessible via network 110. In some scenarios, the contextual information may be stored in real-time as a backup in the event that client device 120 is damaged. For example, client device 120 is utilized to cover a newsworthy event (e.g., a storm, a natural disaster). The contextual information generation program 200 aggregates contextual information related to an electronic communication that includes a streaming video of the event. Contextual information generation program 200 may be configured to monitor and transmit the activities of the user of client device 120 in real time to document the event. In another example, contextual information generation program 200 determines that the user of client device 120 monitors radar and weather data via a web app and has various social media feeds active to acquire additional information.

Contextual information retrieval program 300 retrieves contextual information relating to one or more electronic communications. In one embodiment, contextual information retrieval program 300 retrieves contextual information for a currently received electronic communication. In another embodiment, contextual information retrieval program 300 retrieves contextual information for previous electronic communications. In one scenario, contextual information retrieval program 300 retrieves contextual information for unprocessed electronic communications. In another scenario, contextual information retrieval program 300 retrieves contextual information for previously processed electronic communications. In some embodiments, contextual information retrieval program 300 may retrieve contextual information from file storage 124 on client device 120. In other embodiments, contextual information retrieval program 300 may retrieve contextual information from file storage 104 on server 102. In some embodiments, contextual information retrieval program 300 is a hosted application. For example, contextual information retrieval program 300 may be a web-based application utilized by the user of client device 120.

Figure 2:
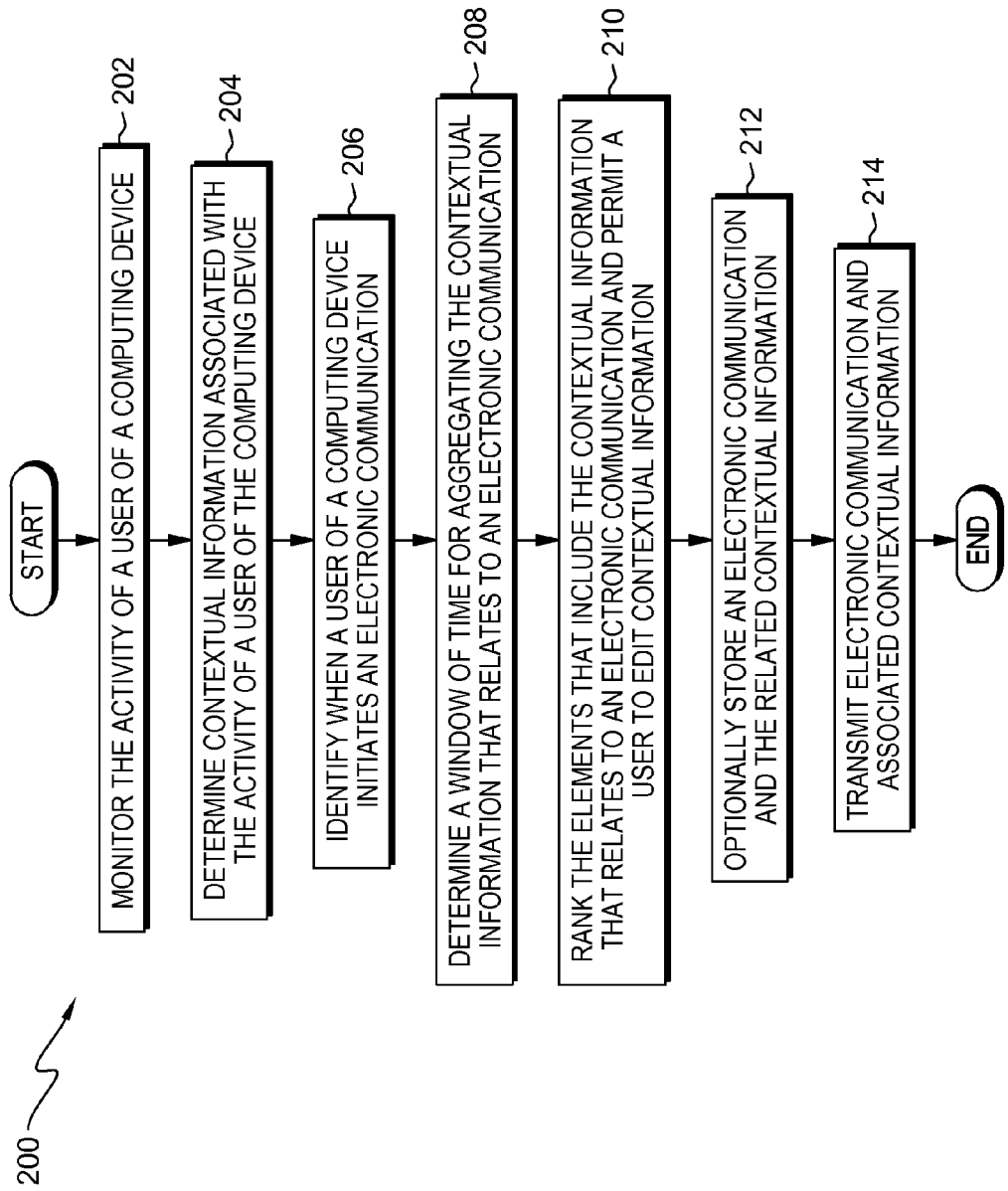
FIG. 2 depicts a flowchart of the operational steps of contextual information generation program, in accordance with an embodiment of the present invention.

FIG. 2 is a flowchart depicting operational steps for contextual information generation program 200, a program for monitoring the activity of a user to obtain contextual information, in accordance with embodiments of the present invention.

In step 202, contextual information generation program 200 monitors the activity of a user of a computing device (e.g., client device 120). User activity monitoring may occur via a UAM program (not shown), a data spider (not shown), or other application or utility known in the art. In one embodiment, contextual information generation program 200 initiates automatically upon the activation of client device 120. In another embodiment, contextual information generation program 200 activates based on an action of a user of client device 120. In one scenario, contextual information generation program 200 may activate based on a user selecting an icon within the GUI of client device 120. In one instance, contextual information generation program 200 activates based on an icon (e.g., widget) depicted in the desktop view of the GUI of client device 120. In another instance, contextual information generation program 200 activates based on an icon depicted within UI 122. In another scenario, contextual information generation program 200 may activate based on one or more user preferences. For example, contextual information generation program 200 may activate when a user of client device 120 activates an e-mail client, an IM app, a suite of productivity (e.g., office) programs, etc. In some embodiments, contextual information generation program 200 may monitor (e.g., record) some or all of the programs and applications utilized by a user of client device 120. For example, contextual information generation program 200 may monitor an e-mail client, an IM app, a calendar function, a web browser, etc.

In some embodiments, contextual information generation program 200 may utilize one or more user preferences to constrain and/or filter which activities of a user that contextual information generation program 200 monitors. For example, contextual information generation program 200 may be constrained from networking activity and security software. In another example, contextual information generation program 200 excludes (e.g., filters) activities associated with or containing information (e.g., flags, keywords, meta-data, etc.), such as non-disclosure agreements (NDA) or confidential disclosure agreements (CDA). In other embodiments, contextual information generation program 200 may utilize multiple windows of time when monitoring the activity of a user.

In step 204, contextual information generation program 200 determines contextual information associated with the activity of a user of client device 120. In one embodiment, contextual information generation program 200 obtains low-level information associated with one or more activities of a user of client device 120. For example, low-level information may include: the uniform resource locator (URL) associated with a website, the title of a video watched by the user, subject lines of e-mails or social media posts, priority flag, etc. In another embodiment, contextual information generation program 200 may determine high-level information, such as tags, meta-data, keywords, time, an author, due date, etc. that is associated with one or more user activities. In some embodiments, contextual information generation program 200 may initially categorize and filter (e.g., does not record, discards) contextual information associated with the activities of a user. For example, prefiltered contextual information may include: URLs, subject lines, videos, wikis, meta-data, blogs, bookmarks, news articles, e-books, and names of activities (e.g., word processor, spreadsheet, etc.) including files utilized by the activities (e.g., Monthly report). Other examples of contextual information that may be filtered (e.g., excluded) are: passwords, user IDs, medical records, financial records, encrypted data, etc. Other types of contextual information that contextual information generation program 200 may filter, based on one or more user preferences, are: demographic data, tags, web-histories, global positioning system (GPS) locations, e-commerce data, and information associated with other users (e.g., performance ratings, salary bands, intranet user IDs, awards, etc.).

In some embodiments, contextual information generation program 200 may limit the amount of contextual information obtained over time. For example, contextual information generation program 200 may for any activity, independent of content or context, dequeue monitoring information in 15-minute intervals, starting six hours after a monitored activity ceases. In one scenario, contextual information generation program 200 may be configured with an activity/contextual retention period for each application (e.g., web browser, e-mail client, IM client, etc.). In another scenario, contextual information generation program 200 may respond to contextual information, either directly obtained or dynamically extracted (e.g., via optical character recognition (OCR), via voice recognition, via image recognition) and adjusts the window of time (e.g., retention time) for a specific activity of a user of client device 120.

In step 206, contextual information generation program 200 detects when a user of a computing device initiates an electronic communication. Contextual information generation program 200 utilizes the time at which an electronic communication is initiated as a reference for the window of time for the aggregation of contextual information. In an embodiment, contextual information generation program 200 responds to one or more user preferences associated with electronic communications on client device 120. For example, contextual information generation program 200 may detect the initiation (e.g., creation) of: an e-mail, an IM, a phone call, or a calendar update. However, based on another user preference, contextual information generation program 200 may not respond to: a web-browsing query, mapping a network driver, and accessing a database. In one example, contextual information generation program 200 may not respond to utilization of social networking software by a user to obtain information about another. In another example, contextual information generation program 200 may not respond to utilization of a weather information website to obtain storm warning information. In another embodiment, contextual information generation program 200 responds to the modification of an electronic communication. For example, a user of client device 120 opens an e-mail that was saved in a draft status. Contextual information generation program 200 appends currently obtained contextual information to contextual information that was obtained at the creation of the e-mail. In some embodiments, contextual information generation program 200 may respond to the initiation (e.g., creation) of any electronic communication.

In step 208, contextual information generation program 200 determines a window of time for aggregating the contextual information that relates to an electronic message. In one embodiment, contextual information generation program 200 determines that one or more user preferences dictate a window of time (e.g., a duration, a period of time) associated with aggregating contextual information for an electronic communication. In one scenario, contextual information generation program 200 utilizes a user preference that dictates a fixed-duration (e.g., 10 minutes) window of time for aggregating the contextual information relating to an electronic communication. In another scenario, contextual information generation program 200 may determine that some electronic communications modes are assigned different windows of time. For example, contextual information generation program 200 assigns an IM a 5-minute window of time. Whereas, contextual information generation program 200 assigns a calendar update a 15-minute window of time and an e-mail a 20-minute window of time. In another embodiment, contextual information generation program 200 may utilize a base window of time and may bias the window of time utilizing other user preferences (e.g., priority, due date, importance, one or more key words in a subject line, etc.). For example, contextual information generation program 200 utilizes a base window of time of 7 minutes. Contextual information generation program 200 determines that the electronic communication is an e-mail (e.g., +3 minutes) to a client (e.g., +5 minutes) and is flagged as a high priority (e.g., +5 minutes). Therefore, contextual information generation program 200 determines that the window of time for this electronic communication is a total of 20 minutes (e.g., 7+3+5+5 minutes).

Referring to step 208, in a different embodiment, contextual information generation program 200 may determine the window of time based on information derived from one or more actions of a user of client device 120. For example, contextual information generation program 200 may react to a user creating an e-mail from an e-mail template entitled "Client draft" by initializing an open-ended window of time to permit the user of client device 120 to research, compile, and edit the text and content associated with the e-mail. In another example, contextual information generation program 200 may determine that a user activates a recording feature associated with an embodiment of the present invention that initializes an open-ended window of time. The recording feature may be associated with UI 122 or may be a user defined hot-key combination. In some scenarios, contextual information generation program 200 may determine that there is a user preference dictating a maximum window of time (e.g., 4 hrs.). In other scenarios, contextual information generation program 200 may delay determining the duration of the window of time.

In step 210, contextual information generation program 200 ranks the elements that include the contextual information that relate to an electronic communication, and contextual information generation program 200 permits a user to edit the contextual information. Contextual information generation program 200 may utilize one or more user preferences to determine the number of contextual elements (e.g., pieces of contextual information) which appear in a ranking of the contextual information relating to an electronic communication. In some embodiments, contextual information generation program 200 may permit a user to vary the number of contextual information items that are ranked and/or displayed. In one embodiment, contextual information generation program 200 utilizes one or more known ranking algorithms. Contextual information generation program 200 may utilize one or more criteria and/or weighting factors, defined by a user, to determine the ranking of items of contextual information. For example, contextual information generation program 200 may utilize: terms (e.g., words, acronyms, etc.), priority flags, status of a second user, hierarchical level of a second user, etc. to rank contextual information elements.

In some scenarios, contextual information generation program 200 may utilize an algorithm that applies weighting factors to elements of contextual information. For example, contextual information generation program 200 may assign a higher weight factor to contextual information obtained closer to the time of creation of an electronic message and a lower weight factor to contextual information obtained closer to beginning of a window of time. In other scenarios, contextual information generation program 200 may weigh contextual information (e.g., research data) aggregated during the creation of the electronic communication more than contextual information aggregated prior to the creation of the electronic communication. In further embodiments, contextual information generation program 200 permits a user (e.g., a user that created an electronic communication) to modify the ranking of or change the number of elements of contextual information relating to the electronic communication.

Referring to step 210, in some embodiments, contextual information generation program 200 delays the transmission of an electronic communication until a user reviews the ranked contextual information elements associated with the aggregated contextual information related to the electronic communication. In one scenario, contextual information generation program 200 permits the user to eliminate (e.g., delete) one or more elements (e.g., pieces of information) of contextual information. For example, a user may determine that contextual information generation program 200 recorded contextual information associated with an activity unrelated to the electronic communication. Subsequently, a user may utilize contextual information generation program 200 to delete the one or more unrelated elements (e.g., items) of contextual information prior to the transmission of the electronic communication. In another example, a user may determine that contextual information generation program 200 recorded contextual information associated with an activity that is proprietary (e.g., an account number, a name of a different client, information covered by a NDA/CDA). In yet another example, contextual information generation program 200 may determine that instances of a request-for-quote (RFQ) that are relevant to the receiver of the electronic communication are kept; whereas contextual information related to an RFQ of a competitor may be excluded (e.g., edited out).

In step 212, contextual information generation program 200 optionally stores an electronic communication and the related contextual information. In one embodiment, contextual information generation program 200 stores contextual information relating to an electronic communication on client device 120 in file storage 124. In one scenario, contextual information generation program 200 may store the contextual information in a log file. In another scenario, contextual information generation program 200 may store the contextual information and the electronic message in a database. In some instances, contextual information generation program 200 stores the contextual information in a database related to the application (e.g., enterprise e-mail application) that generates the electronic communication. For example, contextual information generation program 200 may store the contextual information as comments embedded in a calendar entry. In other instances, contextual information generation program 200 may store the contextual information relating to an electronic communication in a separate database. In some scenarios, contextual information generation program 200 may determine that client device 120 is resource (e.g., persistent storage) constrained. Contextual information generation program 200 periodically uploads contextual information to file storage 104 on server 102 and removes the contextual information from client device 120. For example, when contextual information generation program 200 determines that an electronic communication is finalized (e.g., transmitted, stored as a draft, set as a reminder, set as a calendar entry, etc.), contextual information generation program 200 uploads the related contextual information and deletes the contextual information from client device 120.

In another embodiment, contextual information generation program 200 may store the contextual information off-line, separate from the electronic communication. In this embodiment, contextual information generation program 200 effectively transmits contextual information asynchronously. In one scenario, contextual information generation program 200 may store the contextual information and/or the electronic communication in one or more databases or log files in file storage 104 on server 102. In another scenario, contextual information generation program 200 stores the contextual information and electronic communication in another location (e.g., a different computing device) accessible via network 110. For example, contextual information generation program 200 may store the contextual information on a cloud-based system. In some scenarios contextual information generation program 200 may store, in an additional location (e.g., an off-line server), the contextual information in real-time (e.g., buffers the contextual information). For example, contextual information generation program 200 may store (e.g., transmit) contextual information in real-time in the event that the initiated electronic communication is disrupted. In another example, the electronic communication occurs in real-time; therefore, contextual information generation program 200 stores the contextual information in real-time, documenting relevant activities that occur in parallel to the electronic communication. In other scenarios, contextual information generation program 200 may determine that one or more user preferences permits some electronic communications to transmit automatically.

Referring to step 212, in a further embodiment, contextual information generation program 200 encrypts the contextual information. In one scenario, contextual information generation program 200 encrypts the contextual information such that the contextual information cannot be accessed without the associated electronic communication being stored and accessible on the same computing device. In another scenario, contextual information generation program 200 encrypts the contextual information such that a user may decrypt the contextual information with: a password, an electronic signature, or an encryption key.

In step 214, contextual information generation program 200 transmits an electronic communication and the related contextual information. In one embodiment, contextual information generation program 200 embeds the contextual information relating to an electronic communication within the electronic communication. Embedding the contextual information facilitates the synchronous transmission of the contextual information with the electronic communication. In one scenario, contextual information generation program 200 may subsequently transmit the electronic communication. In another scenario, contextual information generation program 200 may subsequently release the electronic communication to the application that originated the electronic communication and that application transmits the electronic communication. In another embodiment, contextual information generation program 200 may transmit an electronic communication and the related contextual information as separate files. In some instances, contextual information generation program 200 may transmit the electronic communication and the related contextual information synchronously. In other instances, contextual information generation program 200 may transmit the electronic communication and the related contextual information asynchronously.

In further embodiments, contextual information generation program 200 both transmits the contextual information relating to an electronic communication and stores the contextual location. For example, contextual information generation program 200 may store the contextual information in a central repository (e.g., e-mail replication database) as a backup when a user receives the electronic communication on a computing device that does not include contextual information retrieval program 300. In this example, contextual information generation program 200 may transmit contextual information both synchronously and asynchronously. Additionally, contextual information generation program 200 may respectively create a log entry, cross-reference (e.g., lookup table), or list on client device 120 or server 102 that identifies which electronic communications have (e.g., embedded in, linked to, associated with, etc.) related contextual information and where the related contextual information for an electronic communication is stored. In such instances, contextual information retrieval program 300 may subsequently retrieve contextual information more quickly by eliminating searching multiple electronic devises and multiple storage locations.

Referring to step 214, in some embodiments, contextual information generation program 200 processes an electronic communication and the related contextual information but does not transmit the electronic communication and the related contextual information to another user. For example, contextual information generation program 200 responds to the creation of an electronic communication that is a calendar or "to-do" communication that is for a user of client device 120. The calendar or "to-do" communication may be transmitted to an enterprise or web-based application for subsequent processing.

Figure 3:
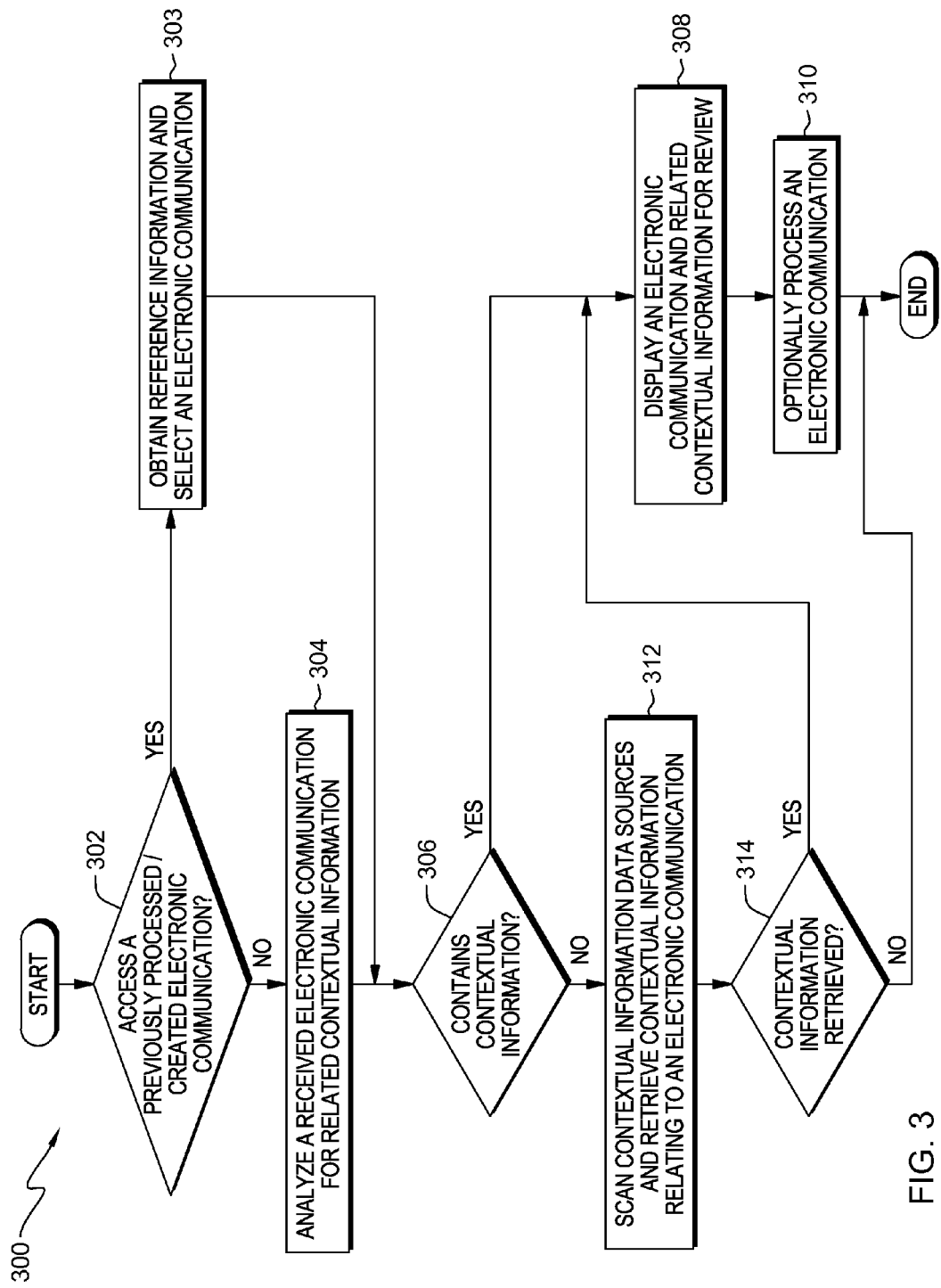
FIG. 3 depicts a flowchart of the operational steps of a contextual information retrieval program, in accordance with an embodiment of the present invention.

FIG. 3 is a flowchart depicting operational steps for contextual information retrieval program 300, a program for retrieving contextual information relating to one or more electronic communications, in accordance with embodiments of the present invention.

In decision step 302, contextual information retrieval program 300 determines whether a user of client device 120 accesses previously processed/created electronic communication. In one embodiment, contextual information retrieval program 300 determines that the user of client device 120 accesses one or more previously received electronic communications. In another embodiment, contextual information retrieval program 300 determines that the user of client device 120 accesses one or more previously created electronic communications. In some embodiments, contextual information retrieval program 300 determines that the user of client device 120 accesses a combination of previously received electronic communications and previously created electronic communications. In one embodiment, contextual information retrieval program 300 determines that a "hotkey" trigger, defined within a user preference, is detected that activates a portion of UI 122 that utilizes the input of reference information. In another embodiment, contextual information retrieval program 300 determines that a user accesses an electronic communication that is flagged to include related contextual information. For example, a user of client device 120 utilizes a calendar function and accesses a scheduled meeting on a different day.

In a different embodiment, contextual information retrieval program 300 determines that a user of client device 120 accesses (e.g., manages) one or more unprocessed electronic communications. In one scenario, contextual information retrieval program 300 determines that a user accesses an electronic communication that is a new electronic communication. In another scenario, contextual information retrieval program 300 determines that the one or more accessed electronic communications are unprocessed electronic communications.

In response to a determination that a user of client device 120 accesses one or more previously processed and/or created electronic communications (yes branch, decision step 302), contextual information retrieval program 300 obtains reference information from the user of client device 120 (step 303).

In step 303, contextual information retrieval program 300 obtains reference information and selects an electronic communication. Reference information utilized by contextual information retrieval program 300 to identify one or more electronic communications may include: a date range, a sender ID, a conversation thread (e.g., subject line text, tags, etc.), and a type of electronic communication (e.g., e-mail, IM, calendar notice, etc.). In some embodiments, contextual information retrieval program 300 obtains the reference information based on the method of accessing a previously processed/created electronic communication. For example, e-mails that include related contextual information may display a flag or emoticon in a field (e.g., subject field, attachment field, type field, etc.) within a message folder. Selecting an electronic communication with known related contextual information may automatically obtain the reference information for contextual information retrieval program 300.

In one embodiment, contextual information retrieval program 300 obtains sufficient reference information from a user of client device 120, via UI 122, to identify and obtain a specific electronic communication. For example, a single e-mail on a specific date has the subject of "Monthly report." In another embodiment, contextual information retrieval program 300 obtains some reference information from a user of client device 120, whereby contextual information retrieval program 300 retrieves a selection of electronic communications that meet the reference information. For example, a user may provide contextual information retrieval program 300 a date range, a sender ID, and the type of electronic communication (e.g., e-mail, IM, calendar notice, etc.). Subsequently, contextual information retrieval program 300 may scan one or more databases or log files to locate one or more electronic communications that match the reference information provided by a user. Contextual information retrieval program 300 receives an indication, via UI 122, as to which one or more electronic communications are selected for subsequent retrieval of contextual information. In some instances, contextual information retrieval program 300 does not receive subsequent selection information and processes the electronic communications obtained based on the reference information. In some embodiments, contextual information retrieval program 300 may execute multiple instances of step 303 while a user searches for an electronic communication.

In a different embodiment, contextual information retrieval program 300 may receive the reference information from another program (e.g., an e-mail client, a calendar function, etc.). In some scenarios, contextual information retrieval program 300 monitors client device 120 for a "hot-key" trigger. For example, a user of client device 120 may access the historical portion (e.g., folders) of an e-mail and may select a previously processed e-mail. While reviewing the previously processed e-mail, the user of client device 120 may activate a "hot-key" combination recognized by contextual information retrieval program 300, and contextual information retrieval program 300 obtains the contextual information related to the selected e-mail.

Referring to decision step 302, in response to a determination that a user of client device 120 accesses a new electronic communication (no branch, decision step 302), contextual information retrieval program 300 analyzes the newly received electronic communication for contextual information (step 304).

In step 304, contextual information retrieval program 300 analyzes a received electronic communication for contextual information. In an embodiment, contextual information retrieval program 300 determines whether an electronic communication contains contextual information by analyzing the electronic communication for a direct indication. For example, contextual information retrieval program 300 may identify a flag, meta-data in the communication header, emoticon, etc. to identify an electronic communication with related contextual information. In another embodiment, contextual information retrieval program 300 scans an electronic communication for one or more indications of contextual information. In one scenario, contextual information retrieval program 300 may scan the text of an electronic communication for structures, delimiters, comments, etc., which may identify the contextual information. In another scenario, contextual information retrieval program 300 may parse the header and meta-data of an electronic communication to identify the existence of contextual information.

In some embodiments, contextual information may be directly linked to an electronic communication. For example, the electronic communication can include contextual information as meta-data (e.g., as in-line text as the electronic communication was created, as a block of text within the electronic communication, etc.). In other embodiments, contextual information is indirectly linked to an electronic communication. For example, contextual information retrieval program 300 may determine that a meta-data flag is set within the electronic communication that indicates that related contextual information exists but is not part of the electronic communication. Contextual information retrieval program 300 may determine that the meta-data flag further includes information indicating a location (e.g., a server, a database, a replica file, etc.) that stores the related contextual information.

In decision step 306, contextual information retrieval program 300 determines whether at least one electronic communication contains related contextual information. In one embodiment, contextual information retrieval program 300 determines that related contextual information is embedded in a received electronic communication (step 304). In another embodiment, contextual information retrieval program 300 determines at least one electronic communication referenced and selected in step 303 contains related contextual information. In some embodiments, contextual information retrieval program 300 determines that a combination of electronic communications occur, one group of electronic communications include related contextual information, and another group of electronic communications do not include related contextual information. In one scenario, contextual information retrieval program 300 spawns a second instance of contextual information retrieval program 300 to separate the combination of electronic communications. In another scenario, contextual information retrieval program 300 utilizes a user preference to prioritize processing the groups of electronic communications.

In response to a determination that at least one electronic communication includes related contextual information (yes branch, decision step 306), contextual information retrieval program 300 displays an electronic communication and the related contextual information (step 308).

In response to a determination that an electronic communication does not contain contextual information (no branch, decision step 306), contextual information retrieval program 300 scans contextual information data sources (step 312).

In step 312, contextual information retrieval program 300 scans contextual information data sources and retrieves the contextual information relating to an electronic communication. In some embodiments, contextual information retrieval program 300 determines the storage location of the contextual information related to an electronic communication via information included in the electronic communication. In some scenarios, contextual information retrieval program 300 obtains the location information for the related contextual data via the analysis performed in step 304 or as part of the reference information and selection process in step 303. For example, the location information may be included within the electronic communication as meta-data or a link (e.g., a hyperlink). In one embodiment, contextual information retrieval program 300 locates the contextual information on client device 120 in file storage 124 as part of a database or a log file. In another embodiment, contextual information retrieval program 300 may locate the contextual information on server 102 in file storage 104 as part of a database or a log file.

In a further embodiment, contextual information retrieval program 300 may determine that the related contextual information is included in more than one data source (e.g., storage location) and may exist in one or more formats. For example, in a resource constrained instance of client device 120, contextual information generation program 200 may store contextual information as a text-based log file as opposed to in a database table. In some scenarios, contextual information retrieval program 300 may locate the contextual information related to an electronic message in multiple locations/computing devices (e.g., enterprise system data storage, cloud-based communication system, a mail file for a user, a user profile file, etc.) accessible via network 110. For example, the contextual information may reside on the system that hosts the program or application (e.g., e-mail client, calendar function) that created the electronic communication and on client device 120. In other scenarios, contextual information retrieval program 300 determines that a user of client device 120 selected two or more electronic communications in step 303. Subsequently, contextual information retrieval program 300 may locate and retrieve the respectively related contextual information for the two or more electronic messages from more than one data source or storage location.

Referring to step 312, in addition, contextual information retrieval program 300 retrieves the related contextual information from a contextual information data source. In one scenario, contextual information retrieval program 300 stores the contextual information related to an electronic communication in file storage 124 on client device 120. In another scenario, contextual information retrieval program 300 may store the contextual information related to an electronic communication in file storage 104 on server 102. In some scenarios, contextual information retrieval program 300 may temporarily store the retrieved contextual information related to an electronic communication until the electronic communication is reviewed (step 308) and/or processed (step 310). The temporary storage utilized by contextual information retrieval program 300 may be on: client device 120, server 102, or any computing or storage device (e.g., an enterprise productivity suite server) accessible via network 110.

In decision step 314, if contextual information retrieval program 300 retrieves contextual information related to at least one electronic communication, in step 312 (yes branch, decision step 314), then contextual information retrieval program 300 displays, for review, the electronic communication and the related contextual information (step 308).

In decision step 314, if contextual information retrieval program 300 does not retrieve (in step 312) contextual information related to at least one electronic communication (no branch, decision step 314), then the current instance of contextual information retrieval program 300 terminates.

In step 308, contextual information retrieval program 300 displays the electronic communication and the related contextual information for review. In an embodiment, contextual information retrieval program 300 displays a currently received electronic communication and the related contextual information. In some scenarios, contextual information retrieval program 300 may permit the customization of the display of electronic communication and related contextual information. For example, contextual information retrieval program 300 may display in split-screen mode with a portion of the display area presenting the electronic communication and another portion of the display area presenting the contextual information. In other scenarios, contextual information retrieval program 300 may provide a user the capability to switch between viewing the electronic communication and the contextual information. In some embodiments, contextual information retrieval program 300 may permit a user of client device 120 that ability to choose which electronic communication to display. For example, contextual information retrieval program 300 may obtain multiple electronic communications (in step 303) when a user accesses the previously processed or created electronic communications.

In other embodiments, contextual information retrieval program 300 may display the one or more electronic communications and the respectively related contextual information for a user to review. In one scenario, contextual information retrieval program 300 may analyze the related contextual information and may present a user an electronic communication and the related contextual information based one or more user preferences. In another scenario, contextual information retrieval program 300 may present the one or more electronic communications or the one or more groups of related contextual information to a user of client device 120. Subsequently, contextual information retrieval program 300 may receive an indication, via UI 122, as to which electronic communication and related contextual information to display.

Referring to step 308, in further embodiments, contextual information retrieval program 300 may provide a user one or more utilities to modify the contextual information associated with an electronic message. In one scenario, contextual information retrieval program 300 detects that a user of client device 120 archives a processed (e.g., replied to, saved, forwarded, etc.) electronic communication. However, the contextual information may be no longer relevant to the electronic communication and may be deleted by the user. In another scenario, contextual information retrieval program 300 may receive updates (e.g., modifications) via UI 122 where additional references, links, or comments are added to the contextual information or the database search criteria for an electronic communication. For example, contextual information retrieval program 300 may receive an indication that a user adds information that links the contextual information and electronic communication to a project or a user ID not originally part of the contextual information. In another example, contextual information retrieval program 300 may provide a utility for a user to copy some or all of the contextual information (e.g., elements) to another software application (e.g., electronic notebook, integrated office suite, etc.).

In an additional embodiment, contextual information retrieval program 300 may provide a decryption utility for a user. In some scenarios, contextual information retrieval program 300 decrypts contextual information relating to an electronic communication, which was previously encrypted by contextual information generation program 200, utilizing at least one of: part of the original electronic communication, a password, an electronic signature, and an encryption key.

In step 310, contextual information retrieval program 300 optionally processes an electronic communication. In one embodiment, contextual information retrieval program 300 links to a program, an application, or a utility that enables a user to process (e.g., save, reply, delete, edit, schedule, handle attachments, etc.) a received electronic communication. In another embodiment, contextual information retrieval program 300 processes the contextual information respectively related one or more previously created or received electronic communications. In some embodiments, contextual information retrieval program 300 detects that a user of client device 120 reviews (step 308) the related contextual information of an electronic communication without further processing of the electronic communication.

Figure 4:
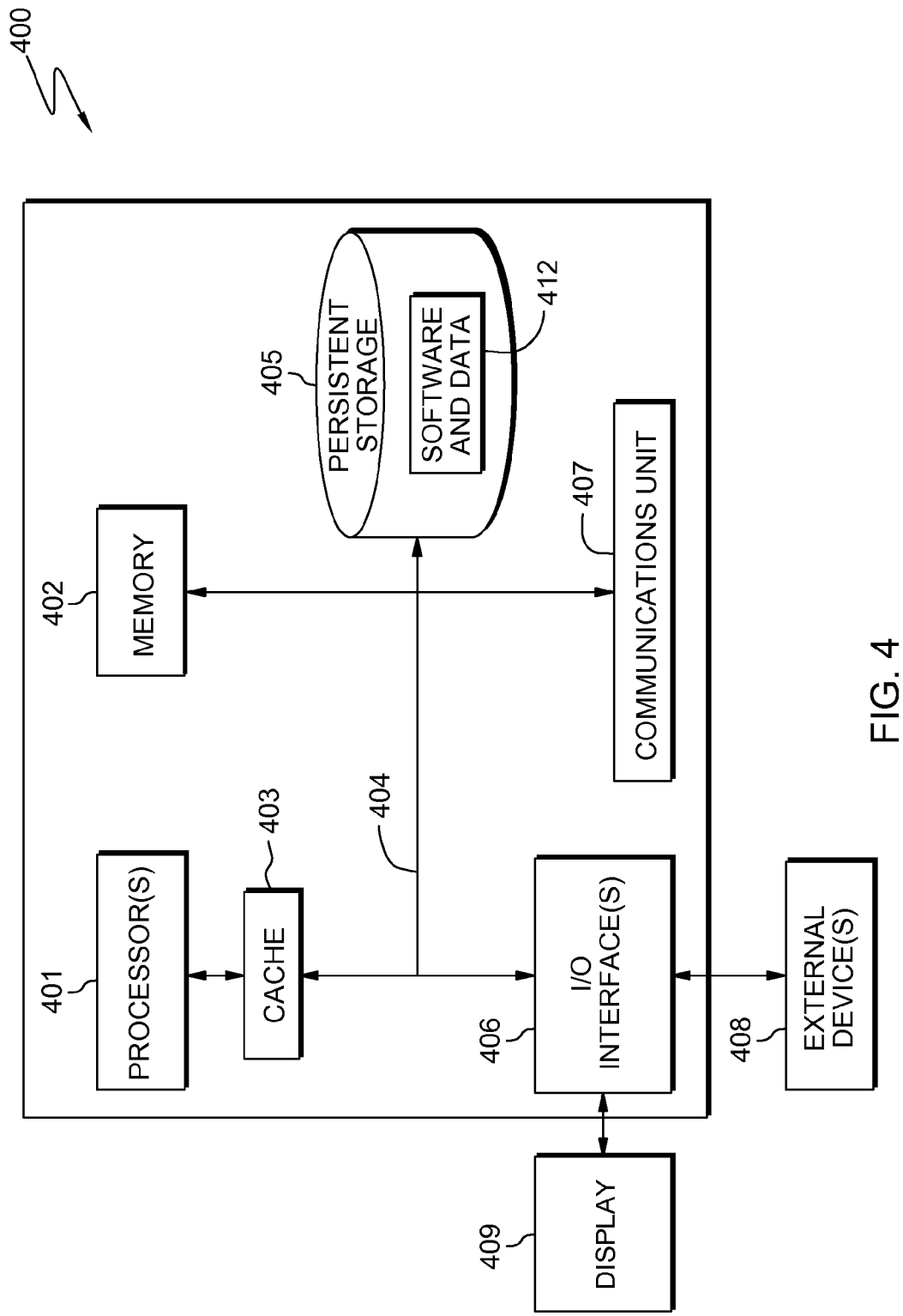
FIG. 4 is a block diagram of components of a computer, in accordance with an embodiment of the present invention.

FIG. 4 depicts computer system 400, which is representative of server 102 and client device 120. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to server 102, software and data 412 includes file storage 104 and various programs (not shown). With respect to client device 120, software and data 412 includes user interface (UI) 122, file storage 124, contextual information generation program 200, contextual information retrieval program 300, and various programs (not shown).

Communications unit 407, in these examples, provides for communications with other data processing systems or devices, including resources of server 102, client device 120. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for associating contextual information with an electronic communication, the method comprising:
    monitoring, by one or more computer processors, one or more activities of a user of a computing device;
    determining, by one or more computer processors, contextual information respectively associated with the one or more monitored activities of the user, wherein the contextual information includes information describing the one or more monitored activities and a geo-location of the computing device and the contextual information is acquired by a gps device embedded within the computing device;
    identifying, by one or more computer processors, the user of the computing device initiating a real-time electronic communication;
    determining, by one or more processors, a set of contextual information respectively associated with the one or more monitored activities of the user that occurs within a window of time, relative to the time that the user of the computing device initiates the real-time electronic communication;
    transmitting, by one or more computer processors, the geo-location of the computing device, and the determined set of contextual information synchronously with the real-time electronic communication;
    modifying, by one or more computer processors, the contextual information related to the real-time electronic communication based, at least in part, on ranking the contextual information, wherein ranking the contextual information is based on information including one or more user preferences, one or more weighting factors, and a time of an activity of the user; and
    editing, by one or more processors, the ranked contextual information, wherein editing further includes determining, by one or more processors, an updated ranking of the contextual information related to the real-time electronic communication based on at least one of: modifying the window of time, deleting one or more pieces of ranked contextual information, and one or more user preferences.

2. The method of claim 1, wherein the contextual information comprises information related to the real-time electronic communication including: a subject, an author, a uniform resource locator, a bookmark, a time duration of an activity, a name of an activity, a name of an output of an activity, meta-data, a blog, a file name, a name of a news article, and social media data.

3. The method of claim 1
wherein editing further includes at least one of:
delaying, by one or more processors, a transmission of the real-time electronic communication; and
deleting, by one or more processors, a piece of contextual information.

4. The method of claim 1, wherein transmitting the contextual information further comprises at least one of:
embedding the contextual information within the real-time electronic communication, creating a cross-reference relating a storage location of the contextual information and a storage location of the real time electronic communication, linking the contextual information to the real-time electronic communication, and transmitting the contextual information to another computing device; and
wherein the storage location includes at least one of a log file and a database, that reside on at least one of: the computing device of the user, a cloud-based storage location, a web-based storage location, a local server, an off-line server, an enterprise system, and a different computing device which receives the real-time electronic communication.

5. The method of claim 1, further comprising:
encrypting, by one or more computer processors, stored contextual information, wherein the encryption of the stored contextual information is based on at least one of: the real-time electronic communication, a password, an electronic signature, and an encryption key.

6. A computer program product for associating contextual information with an electronic communication, the computer program product comprising:
one or more computer readable storage media and program instructions stored on the one or more computer readable storage media, the program instructions comprising:
program instructions to monitor one or more activities of a user of a computing device;
program instructions to determine contextual information respectively associated with the one or more monitored activities of the user, wherein the contextual information includes information describing the one or more monitored activities and a geo-location of the computing device and the contextual information is acquired by a gps device embedded within the computing device;
program instructions to identify the user of the computing device initiating a real-time electronic communication;
program instructions to determine, a set of contextual information respectively associated with the one or more monitored activities of the user that occurs within a window of time, relative to the time that the user of the computing device initiates the real-time electronic communication;
program instructions to transmit the geo-location of the computing device, and the determined set of contextual information synchronously with the real-time electronic communication;
program instructions to modify the contextual information related to the real-time electronic communication based, at least in part, on ranking the contextual information, wherein ranking the contextual information is based on information including one or more user preferences, one or more weighting factors, and a time of an activity of the user; and
program instructions to edit the ranked contextual information, wherein editing further includes determining an updated ranking of the contextual information related to the real-time electronic communication based on at least one of: modifying the window of time, deleting one or more pieces of ranked contextual information, and one or more user preferences.

7. The computer program product of claim 6, wherein the contextual information comprises information related to the real-time electronic communication including: a subject, an author, a uniform resource locator, a bookmark, a time duration of an activity, a name of an activity, a name of an output of an activity, meta-data, a blog, a file name, a name of a news article, and social media data.

8. The computer program product of claim 6
wherein editing further includes at least one of:
program instructions to delay a transmission of the real-time electronic communication; and
program instructions to delete a piece of contextual information.

9. The computer program product of claim 6, wherein program instructions to transmit the contextual information further comprises at least one of:
program instruction to embed the contextual information within the real-time electronic communication, create a cross-reference relating a storage location of the contextual information and a storage location of the real-time electronic communication, link the contextual information to the real-time electronic communication, and transmit the contextual information to another computing device; and
wherein the storage location includes at least one of a log file and a database, that reside on at least one of: the computing device of the user, a cloud-based storage location, a web-based storage location, a local server, an off-line server, an enterprise system, and a different computing device which receives the real-time electronic communication.

10. The computer program product of claim 6, further comprising:
program instructions to encrypt the stored contextual information, wherein the encryption of stored contextual information is based on at least one of: the real-time electronic communication, a password, an electronic signature, and an encryption key.

11. A computer system for associating contextual information with an electronic communication, the computer system comprising:
one or more computer processors;
one or more computer readable storage media;

program instructions stored on the computer readable storage media for execution by at least one of the one or more computer processors, the program instructions comprising:

program instructions to monitor one or more activities of a user of a computing device;

program instructions to determine contextual information respectively associated with the one or more monitored activities of the user, wherein the contextual information includes information describing the one or more monitored activities and a geo-location of the computing device and the contextual information is acquired by a gps device embedded within the computing device;

program instructions to identify the user of the computing device initiating a real-time electronic communication;

program instructions to determine, a set of contextual information respectively associated with the one or more monitored activities of the user that occurs within a window of time, relative to the time that the user of the computing device initiates the real-time electronic communication;

program instructions to transmit the geo-location of the computing device, and the determined set of contextual information synchronously with the real-time electronic communication;

program instructions to modify the contextual information related to the real-time electronic communication based, at least in part, on ranking the contextual information, wherein ranking the contextual information is based on information including one or more user preferences, one or more weighting factors, and a time of an activity of the user; and program instructions to edit the ranked contextual information, wherein editing further includes determining an updated ranking of the contextual information related to the real-time electronic communication based on at least one of: modifying the window of time, deleting one or more pieces of ranked contextual information, and one or more user preferences.

12. The computer system of claim 11, wherein the contextual information comprises information related to the real-time electronic communication including: a subject, an author, a uniform resource locator, a bookmark, a time duration of an activity, a name of an activity, a name of an output of an activity, meta-data, a blog, a file name, a name of a news article, and social media data.

13. The computer system product of claim 11 wherein editing further includes at least one of:

program instructions to delay a transmission of the real-time electronic communication; and program instructions to delete a piece of contextual information.

14. The computer system of claim 11, wherein program instruction to transmit the contextual information further comprises at least one of:

program instruction to embed the contextual information within the real-time electronic communication, create a cross-reference relating a storage location of the contextual information and a storage location of the real-time electronic communication, link the contextual information to the real-time electronic communication, and transmit the contextual information to another computing device; and wherein the storage location includes at least one of a log file and a database, that reside on at least one of: the computing device of the user, a cloud-based storage location, a web-based storage location, a local server, an off-line server, an enterprise system, and a different computing device which receives the real-time electronic communication.

* * * * *